(12) United States Patent
Bilski

(10) Patent No.: US 7,380,106 B1
(45) Date of Patent: May 27, 2008

(54) METHOD AND SYSTEM FOR TRANSFERRING DATA BETWEEN A REGISTER IN A PROCESSOR AND A POINT-TO-POINT COMMUNICATION LINK

(75) Inventor: Goran Bilski, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 654 days.

(21) Appl. No.: 10/377,855

(22) Filed: Feb. 28, 2003

(51) Int. Cl.
- *G06F 7/38* (2006.01)
- *G06F 9/00* (2006.01)
- *G06F 9/44* (2006.01)
- *G06F 15/00* (2006.01)

(52) U.S. Cl. .................................................. 712/225
(58) Field of Classification Search ................ 712/225
See application file for complete search history.

(56) References Cited

U.S. PATENT DOCUMENTS

| | | | |
|---|---|---|---|
| 4,914,653 A * | 4/1990 | Bishop et al. | 370/462 |
| 5,600,845 A | 2/1997 | Gilson | |
| 5,737,631 A * | 4/1998 | Trimberger | 712/37 |
| 6,237,085 B1 * | 5/2001 | Burns et al. | 712/223 |
| 2002/0016869 A1 * | 2/2002 | Comeau et al. | 709/324 |

OTHER PUBLICATIONS

Computer Organization and Design by Hennessy and Patterson.*
U.S. Appl. No. 10/229,543, filed Aug. 27, 2002, Ganesan et al.
Xilinx, Inc.; "MicroBlaze Hardware Reference Guide"; Mar. 2002; available from Xilinx, Inc., 2100 Logic Drive, San Jose, California 95124; pp. 1-20.
SGS-Thomson; "32-bit floating-point transputer"; IMS T805; Feb. 1996; available from SGS-Thomson Microelectronics; pp. 1-71.
http://www.wizzy.com/wizzy/transputer_faq.txt; "The Transputer FAQ"; dowloaded Jan. 14, 2003; pp. 1-13.

\* cited by examiner

*Primary Examiner*—Eddie Chan
*Assistant Examiner*—Brian P Johnson
(74) *Attorney, Agent, or Firm*—Kim Kanzaki; John King

(57) ABSTRACT

A method and a system for transferring data between a register in a processor and a point-to-point communications link. More specifically, blocking and non-blocking methods are described to get and put data between a general purpose register of a soft or hard core processor and a queue connected to a point-to-point communications channel. One implementation example is for a Fast Simplex Link multi-processor network.

18 Claims, 6 Drawing Sheets

METHOD AND SYSTEM FOR TRANSFERRING DATA BETWEEN A REGISTER IN A PROCESSOR AND A POINT-TO-POINT COMMUNICATION LINK

FIELD OF THE INVENTION

The invention relates to processors. More particularly, the invention relates to point-to-point communications between a processor and another system.

BACKGROUND OF THE INVENTION

Multi-processor networks provide one solution to handling the more and more complex applications that are being written. One conventional implementation uses a transputer, which is a specialized microprocessor having on-chip serial links to communicate with other transputers.

The transputer approach assumes there are two communicating processors. If processor A is on a first transputer and a processor B is on a second transputer, and if processor A wants to send processor B a data item, then processor A writes the data item to a specialized memory address in the first transputer. This specialized memory address is connected to a specialized memory address in the second transputer via an uni-directional unbuffered communication channel (there is also a uni-directional return communication channel). Processor A sends the data item and blocks until it gets an acknowledgment from processor B indicating processor B has received the data item. A more detailed explanation can be found in the description for the IMS T805 transputer, titled "32-bit floating-point transputer", by SGS-Thompson Microelectronics, dated February 1996.

Some of the disadvantages of above transputer approach are: that the transmitting processor A stops execution until the receiving processor B gets the data item; and because there is no buffering, processor B must service the data items at least as fast as processor A sends them. In addition, the communication link between processors is not a register on processor A to a register on processor B dedicated link, but through a shared resource, i.e., the specialized memory address on processor A and specialized memory address on processor B. For example, two registers on processor A may need to share the same specialized memory address, and this increases data transfer time.

Accordingly, it is desirable to have an improved scheme for transfer of data to or from the registers in a processor when there is a point-to-point communication link with a source or receiver of data, which overcomes the above-described deficiencies.

SUMMARY OF THE INVENTION

The present invention includes a method and a system for transferring data between a register in a processor and a point-to-point communications link. More specifically, blocking and non-blocking methods are described to get and put data between a general purpose register of a soft or hard core processor and a queue connected to a point-to-point communications channel. One embodiment is for a Fast Simplex Link multi-processor network.

Another embodiment of the present invention includes a method for a processor getting data from a queue. The processor, includes a status register having a flag indicating an arithmetic carry, and is configured to execute a plurality of instructions. First, the flag is assured to be equal to a predetermined value, when the queue is not empty of data. Next, an item of data is read from the queue, if the flag is equal to the predetermined value. And lastly, the flag is used by an instruction executed by the processor.

Yet another embodiment of the present invention includes a method for a processor getting data from a queue. The data includes a modified data item having a control flag and the processor includes a status register having an error flag indicating a status of the control flag. First, a read instruction having a predetermined value is executed for the control flag, where the read instruction is for reading the modified data item from the queue. Next, when the set value of the control flag in the modified data item is different from the predetermined value, the error flag is asserted. And lastly, the processor uses the error flag in another instruction.

An aspect of the present invention includes a system for getting/putting data via a communications link including: a queue having an empty/full indication, coupled to the communications link for receiving/putting an item of data; a processor, comprising a plurality of registers, for using the item; a first register coupled to the queue for storing the item; and a second register, including a carry flag configured for evaluation by an arithmetic instruction executed by the processor, wherein a value of the carry flag is based on the empty/full indication.

Another aspect of the present invention includes a data structure for transferring data between a sender system and a receiver system connected via a point-to-point communications link, where the data structure is stored in a computer readable medium. The data structure includes a first entry having a plurality of data bits; and a second entry having at least one control bit set to a logical value by the sender system, where the logical value is tested by the receiver system, and wherein a flag is set when the logical value is not equal to a predetermined value.

An embodiment of the present invention includes a system for communication of data units between a plurality of processors. The system includes: a modified data unit having a plurality of data bits and a control flag; a first processor configured to send the modified data unit and to set the control flag to a first predetermined value; and a second processor for receiving the modified data unit, where the second processor is coupled to the first processor and has a status register having an error flag, and wherein the second processor is configured to determine a second predetermined value, and wherein the error flag is set when the first predetermined value is unequal to the second predetermined value.

Yet another embodiment of the present invention includes a fast linked multiprocessor network, including: a plurality of processing modules, wherein each processing module has a status register and a general purpose register; and a plurality of configurable uni-directional links coupled among at least two of the plurality processing modules, where the a configurable uni-directional link provides a communications channel between at least two processing modules. In addition, a configurable uni-directional link includes an output queue at a first end of the communications channel and an input queue at a second end of the communications channel; and wherein the status register includes a flag having an indication if the input queue is not empty.

BRIEF DESCRIPTION OF THE DRAWINGS

The present invention is illustrated by way of example, and not by way of limitation, in the following figures.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention.

Figure 6:
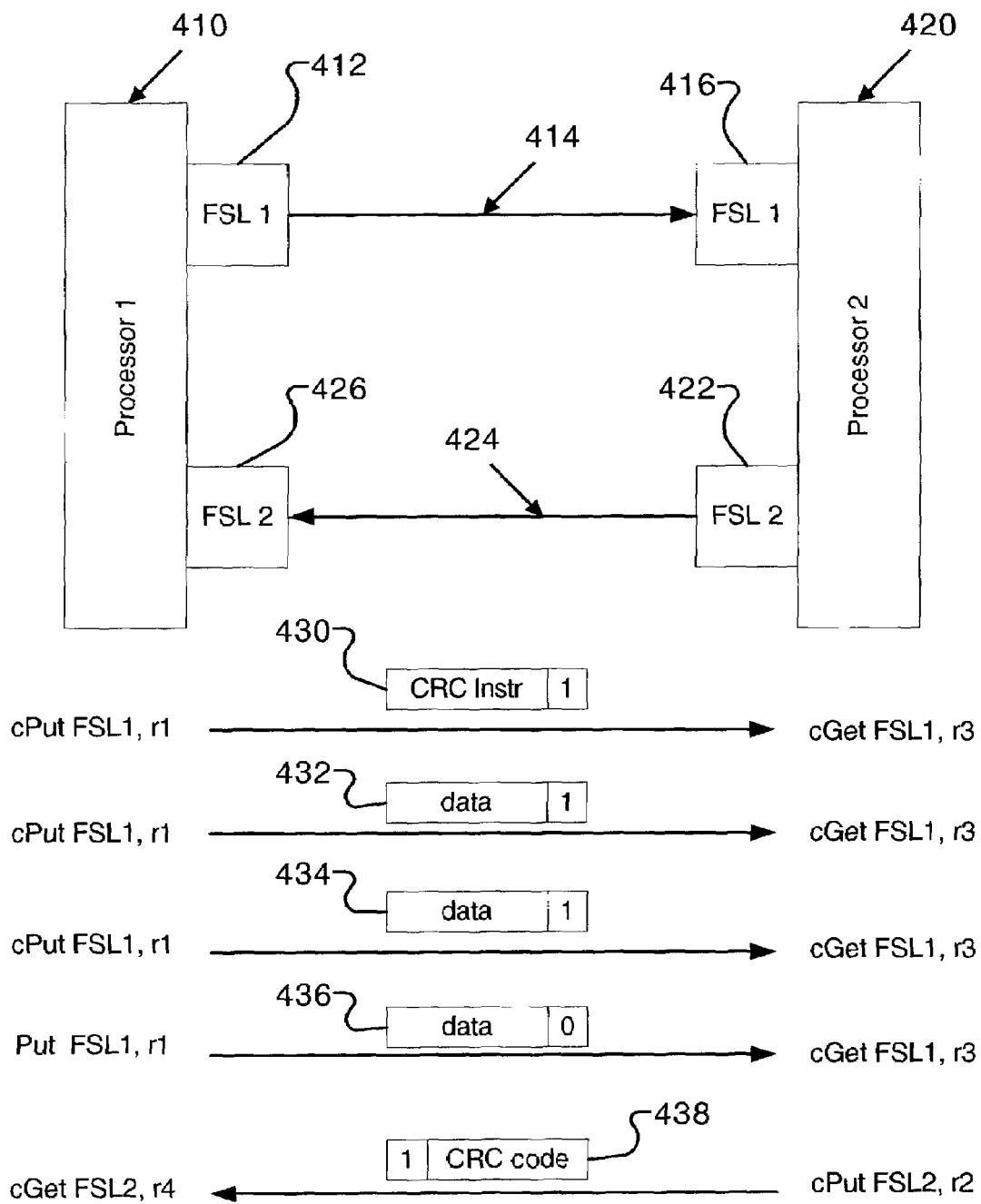
FIG. 6 is an example of a fast linked multiprocessor network and an example of a transfer of data between two processors of the network.

An exemplary multi-processor network is used to illustrate embodiments of the present invention. This is for illustration purposes only and is not to be construed as limiting the scope of the present invention. FIG. 6 shows a two processor network connected together by two configurable uni-directional links. Processor 1 410 and FSL1 412 in FIG. 6 includes processor 100 in FIG. 1 and FSL$_j$ 222 in FIG. 2

An example of processor 1 is a soft core microprocessor, such as MicroBlaze™ f Xilinx Inc. of San Jose, Calif. A soft core microprocessor is a processor that is programmed into a Field Programmable Gate Array (FPGA). However, it should be understood that the scope of present invention is not so limited, but also applies to any processor, including hard core microprocessors such as the Pentium® processor of Intel® Corp. of Santa Clara, Calif., the PowerPC® of IBM Corp. of Armonk, N.Y., or a Digital Signal Processing (DSP) processor of Texas Instruments of Dallas, Tex.

Figure 1:
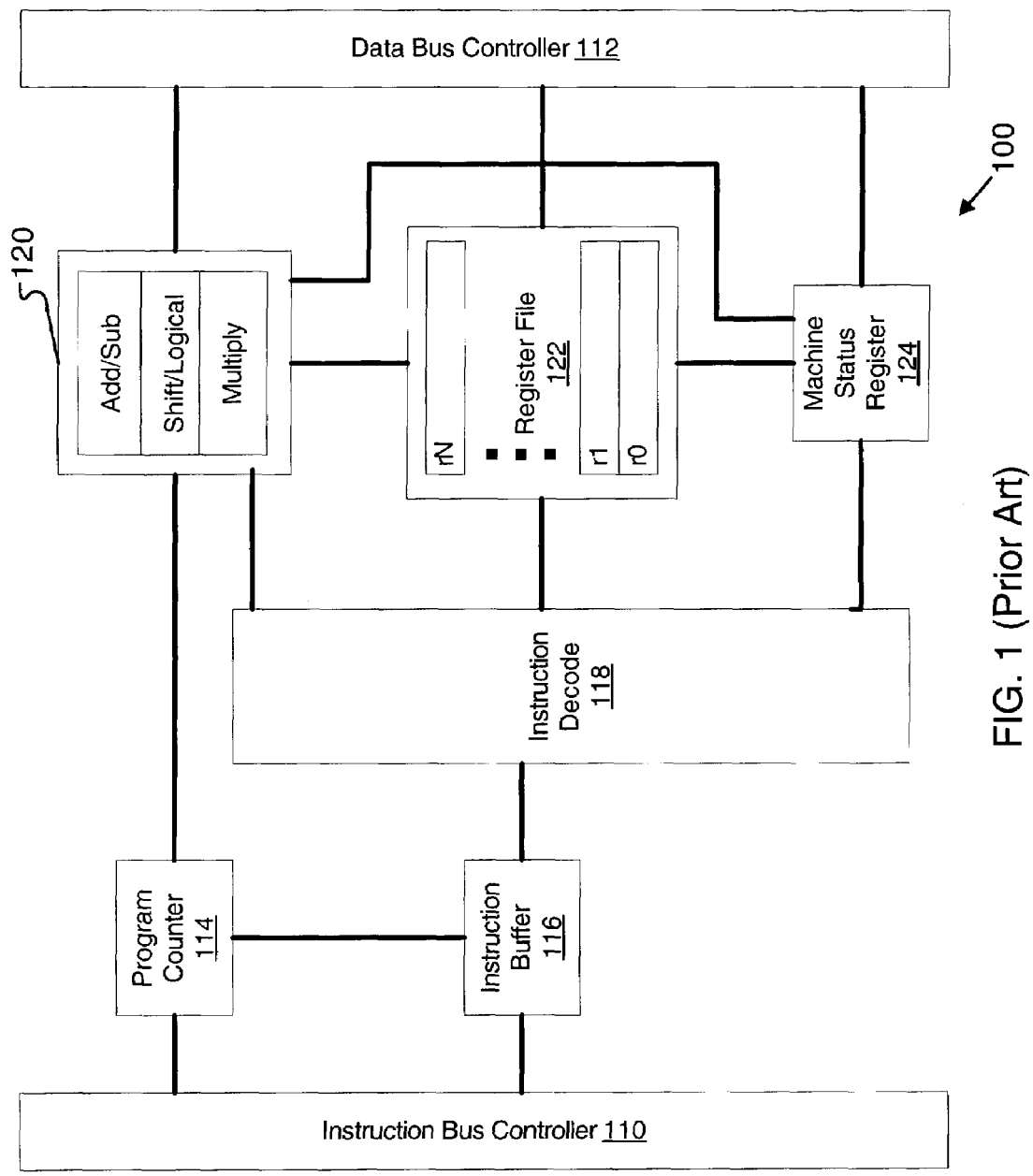
FIG. 1 is a simplified prior art block diagram of the MicroBlaze™ soft core processor of Xilinx Corp. of San Jose, Calif.

FIG. 1 is a simplified prior art block diagram of the MicroBlaze™ soft core processor. Processor 100 includes instruction bus controller 110, program counter 114, instruction buffer 116, instruction decode 118, arithmetic logic unit (ALU) 120, register file 122, machine status register (MSR) 124, and data bus controller 112. The instruction bus controller 110 receives a 32 bit instruction from memory (not shown) and sends the instruction to instruction buffer 116. The instruction buffer 116 is connected to program counter 114 and to instruction decode 118. Instruction decode 118 executes the instruction by controlling one or more operations on ALU 120, reading/writing to/from register file 122 having N general purpose registers, or reading/writing to/from MSR 124. Data, for example, a 32-bit word, is received by data bus controller 112 and stored in a general purpose register in register file 122, where, for example, N=32. The data may also be manipulated by the ALU 120 before being stored in the register file 122. The MSR 124 includes an arithmetic carry flag which is set by certain arithmetic add or subtract instructions.

Figure 2:
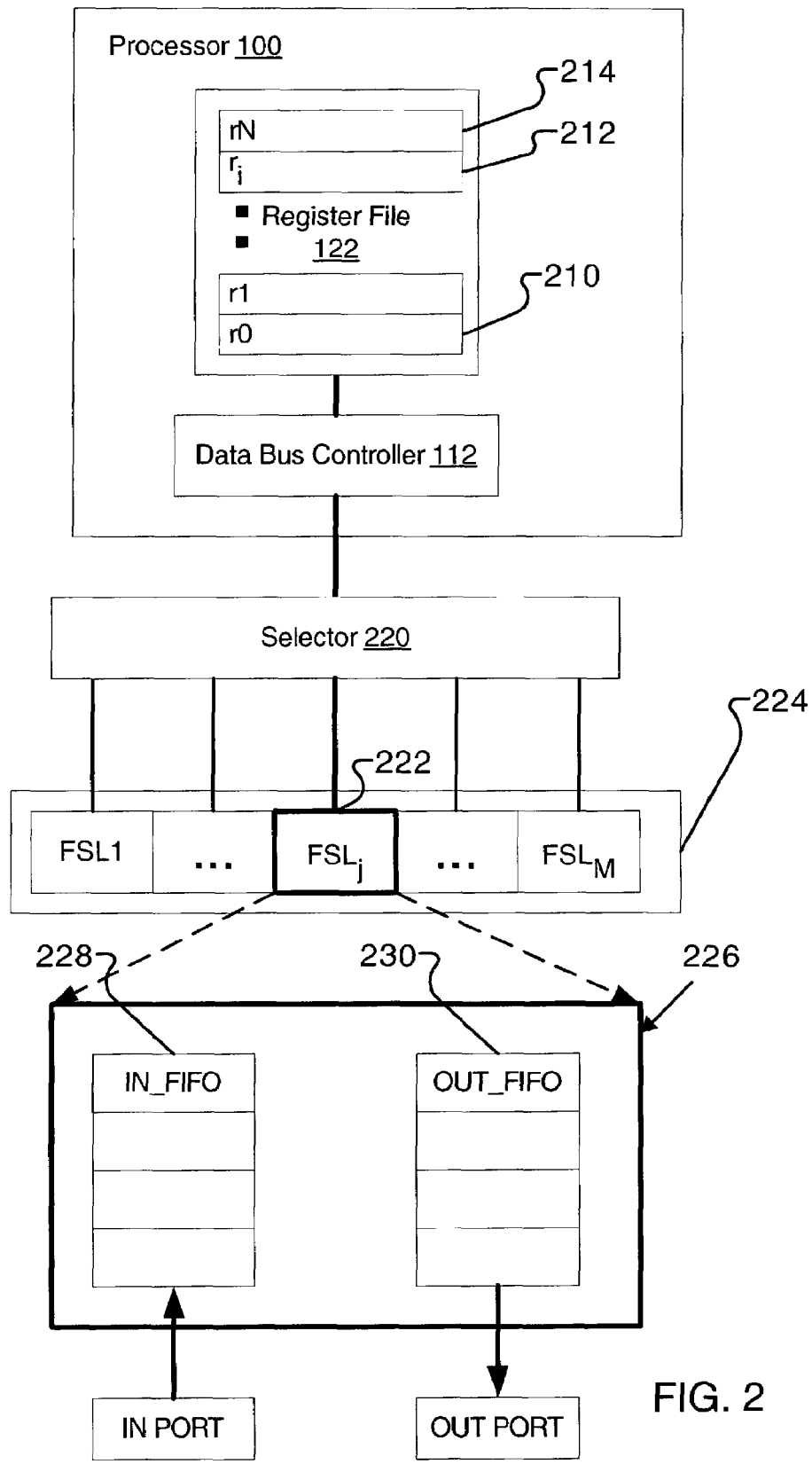
FIG. 2 is a block diagram of part of a point-to-point communications system of an embodiment of the present invention.

FIG. 2 is a block diagram of part of a point-to-point communications system of an embodiment of the present invention. Processor 100 having register file 122 and data bus controller 112, is connected to selector 220. Selector 220 is a switch controlling input and output between processor 100 and the Fast Simplex Link (FSL) module 224. FSL module 224 has M FSLs, where M is an integer. Both the number M of FSLs in FSL module 224 and the depth of each FIFO are user configurable. For example, when M=N=32 there is one FSL for each of the 32 general purpose registers in register file 122. The expansion of one FSL 222, e.g., FSLj, where j is an integer, is shown as module 226 having an input first-in-first-out (FIFO) queue IN_FIFO 228 and an output first-in-first-out (FIFO) queue OUT_FIFO 230. IN_FIFO 228 receives data through an input port (IN PORT) from an output. FIFO located at another system, e.g., another processor, via a uni-directional unshared serial point-to-point communications channel. Similarly, OUT_FIFO 230 sends data through an output port (OUT PORT) to an input FIFO located at another system, e.g., another processor, via another uni-directional unshared serial point-to-point communications channel. Hence a configurable uni-directional link includes a source output queue at a first processor sending data items via a uni-directional unshared serial point-to-point communications channel to a sink input queue at a second processor. The details of the FSL are in U.S. patent application, titled "METHOD AND SYSTEM FOR FAST LINKED PROCESSOR IN A SYSTEM_ON_CHIP (SoC)" by Satish R. Ganesan, et. al., Ser. No. 10/229,543, filed Aug. 27, 2002, which is herein incorporated by reference in its entirety.

In the illustrative example (see top of FIG. 6), let processor 1 410 have a FSL1 output queue 412 that has a first uni-directional serial point-to-point communications channel 414 to a FSL1 input queue 416 at processor 2 420, and processor 420 have a FSL2 output queue 422 that has a second uni-directional serial point-to-point communications channel 424 to a FSL2 input queue 426 at processor 410. Further let FSL1 412 at processor 410 be connected to general purpose register r1 (not shown) in processor 410, FSL2 426 at processor 410 be connected to general purpose register r2 (not shown) in processor 410, FSL1 416 at processor 420 be connected to general purpose register r1 (not shown) in processor 420, and FSL2 422 at processor 420 be connected to general purpose register r2 (not shown) in processor 420. Thus there is no need to know the address of the data.

Processor 410 puts a data item, e.g., 32-bit data word, from its register r1 onto its FSL1 412 output FIFO as long as the FIFO is not full. The data item is transferred from the FSL1 412 output FIFO via channel 414 to the FSL1 416 input FIFO automatically. Processor 420 gets for its register r1 data, including the data item, e.g., the 32-bit data word, from input FIFO of FSL1 416 as long as the queue is not empty. Similarly, processor 420 puts another data item on its output FIFO of FSL2 422 which goes to input FIFO of FSL 426 via channel 424 to be retrieved or gotten by processor 410.

The processor, e.g., processor 410 or processor 420, uses a "Get", "nGet", or "ncGet" software instruction to transfer a data item from the input queue to a general purpose register of the processor, and a "Put", "nPut", or "ncPut" software instruction to transfer a data item to the input queue from a general purpose register of the processor in a preferred embodiment of the present invention. The formats of the "Get" and "Put" instructions are:

Get fromInputFSL J, toReg K;

Put toOutputFSL J, fromReg K;

where J and K are integers. Get and Put are the opcodes. And the first argument of the instruction is the identifier for the FSL, and the second argument is the identifier for the general purpose register. In the preferred embodiment neither a Get or Put instruction nor multiple Get instructions nor multiple Put instructions are executed concurrently, hence there is only one carry flag (status flag) set/cleared in the MSR. However, in an alternative embodiment there are a plurality of carry flags (status flags) in the MSR, one for each FSL.

The "Get" and "Put" instructions are blocking instructions in which the processor will stop executing the instruction and enter a wait state when the get or put instruction is executed and the FIFO is empty or full, respectively. When the FIFO has at least one data item added in the case of an empty input FIFO or removed in the case of a full output FIFO, execution of the get or put instruction is completed, i.e., the data item is gotten or put, and the next instruction is executed.

An example of instruction to get eight data words using the blocking "Get" instruction is:

| | |
|---|---|
| addi r7, r0, 8 | r7 := r0 + 8 |
| addi r8, r0, #BaseMemAddr | r8 := r0 + base address in memory |
| loop: get FSL1, r1; | |
| sb r1, r8, r7; | store r1 into memory address r8 + r7 |
| addi r7, r7, −1; | r7 := r7 − 1 |
| BGE r7, loop; | branch to loop if r7 >= 0 | where r0=0.

The "nGet" and "nPut" instructions are non-blocking instructions in which the processor will continuing executing, when the nGet or nPut instruction is executed and the FIFO is empty or full, respectively. A data item is not gotten from the empty FIFO nor a data item put in a full queue, but a flag is set to "0" in the MSR and the next instruction is then executed. If the queue is not empty or full, then execution of the nGet or nPut instruction gets the data from the input FIFO or puts the data item into the output FIFO, respectively and the flag is set to "1". In a preferred embodiment of the present invention the flag that is set is the carry flag in the MSR. In an alternative embodiment, the flag is a status flag in the MSR.

An example of instructions to get and store eight data words (8 downto 1), using the non-blocking "nGet" instruction and setting a status bit, is:
  addi r7, r0, 8
  addi r8, r0, BaseMemAddr
  loop: nGet FSL1, r1;
  MFS r10, MSR load MSR into r10
  ANDI r10, r10, #MASK Mask r10 to get status bit
  BE r10, loop branch to loop if r10 = 0
  sb r1, r8, r7 store r1 into memory address r8 +r7
  addi r7, r7, −1 r7 := r7 −1
  BGEI r7, loop branch to loop if r7 >= 0

An example of instructions to get and store eight data words (1 to 8), using the blocking "nGet" instruction and setting a carry bit, is:
  addi r9, r0, 8 r9 := r0 + 8
  rsubik r7, r9, 1 r7 := 1 − r9
  addi r8, r9, #BaseMemAddr r8 := base address + 8
  loop: get FSL1, r1;
  sb r1, r8, r7 store r1 into memory address r8 + r7
  addikc r7, r7, 0 r7 := r7 + 0 + carry
  BLEI r7, loop branch to loop if r7 <= 0

From the two examples for "nGet" given above, using the carry flag rather than a status flag in the MSR allows direct use of the carry flag in an arithmetic instruction, e.g., rsubc. Thus the instructions to load, mask, and test the flag in the MSR is not needed.

Figure 3:
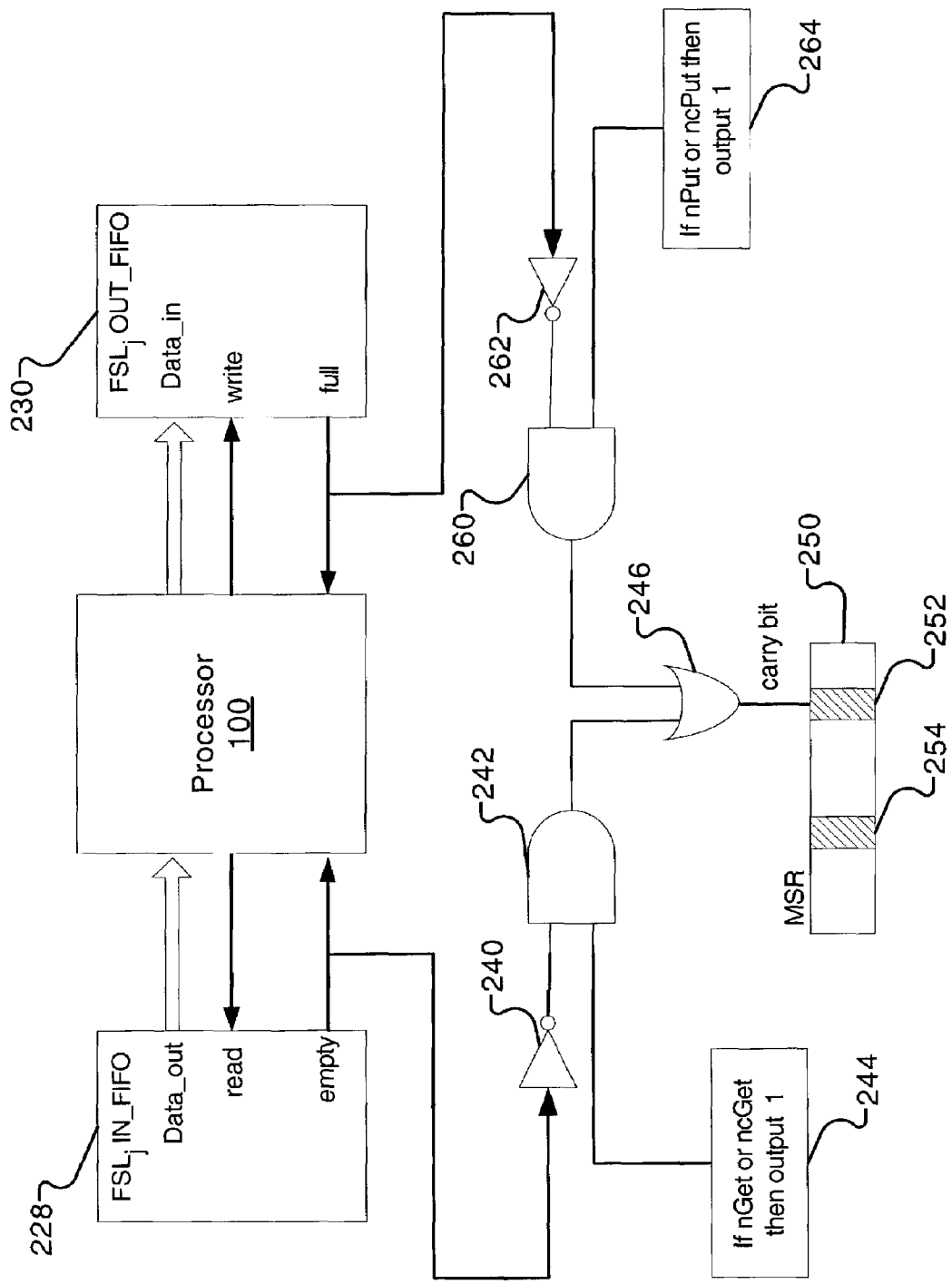
FIG. 3 is a block diagram of the FIFO's setting a flag in the MSR of an embodiment of the present invention.

FIG. 3 is a block diagram of the FIFO's setting a flag in the MSR of an embodiment of the present invention. Processor 100 is connected to input FIFO FSLj IN_FIFO 228 and output FIFO FSLj OUT_FIFO 230. The empty flag of input FIFO 228 is inverted via inverter 240 and is one input to AND gate 242. If a nGet (or ncGet) instruction 244 is executed, then the second input to AND gate 242 is 1, otherwise the second input is 0. The output of AND gate 242 goes to OR gate 246. The output of OR gate 246 sets the carry bit 252 (or status bit 254). When the input FIFO 228 is empty full (a 1 is output as the empty signal), then the output of AND gate 242 is 0 and the carry bit is 0 (assuming a nPut or ncPut is not being executed). When input FIFO 228 is available (not empty) and a nGet (or ncGet) instruction is executed then the output of AND gate 242 is 1 and the carry bit 252 (or status bit 254) is set to 1 via OR gate 246.

Similarly, the full flag of output FIFO 230 is inverted via inverter 262 and is one input to AND gate 260. If a nPut (or ncPut) instruction 244 is executed, then the second input to AND gate 260 is 1, otherwise the second input is 0. The output of AND gate 260 goes to OR gate 246. The output of OR gate 246 sets the carry bit 252 (or status bit 254). When the output FIFO 228 is full (a 1 is output as the full signal), then the output of AND gate 260 is 0 and the carry bit is 0 (assuming a nGet or ncGet is not being executed). When output FIFO 230 is available (not full) and a nPut (or ncPut) instruction is executed, then the output of AND gate 260 is 1 and the carry bit 252 (or status bit 254) is set to 1 via OR gate 246.

Figure 4:
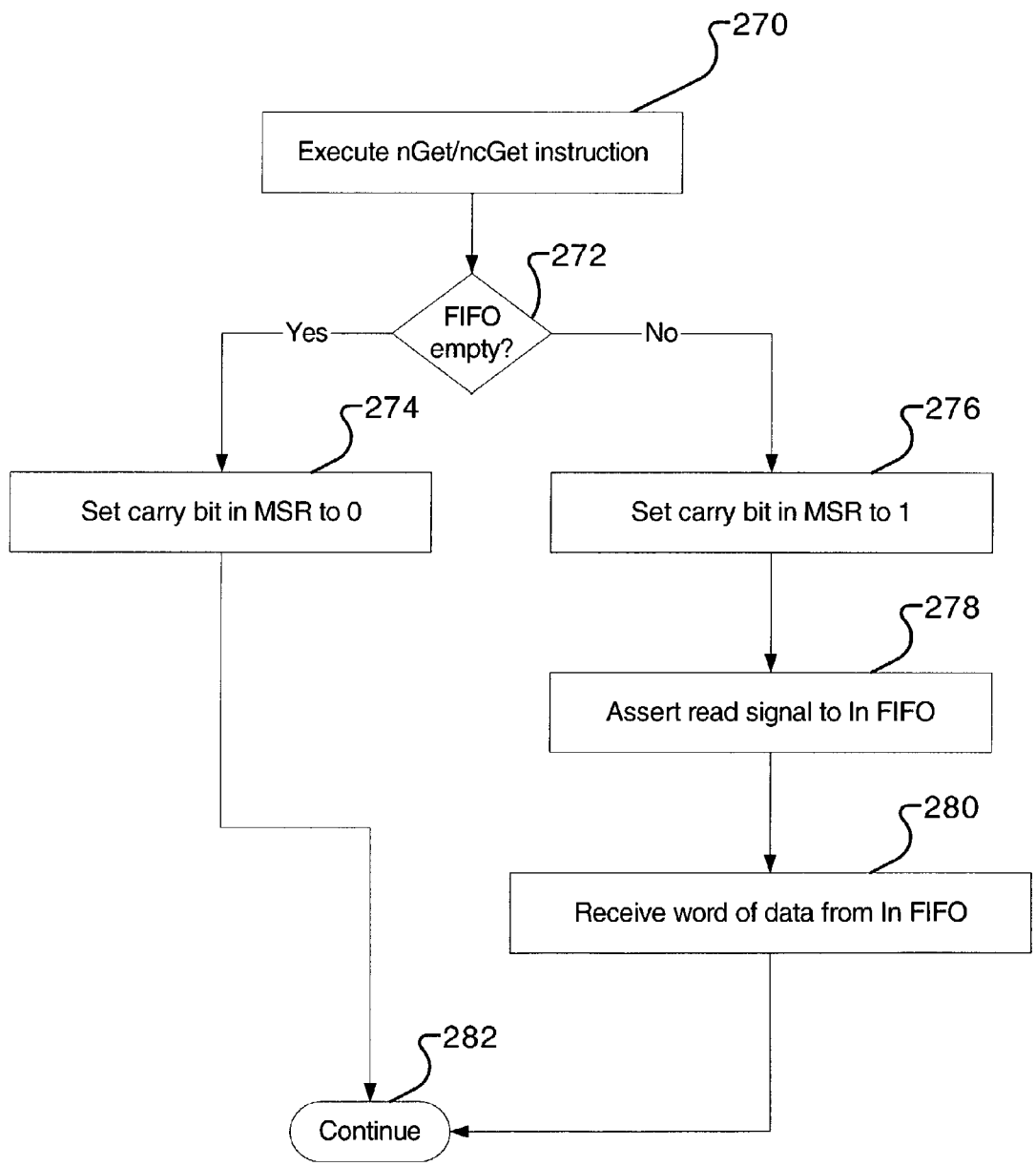
FIG. 4 is a flowchart of the processor getting an item of data from the input FIFO of an embodiment of the present invention.

FIG. 4 is a flowchart of the processor getting an item of data from the input FIFO of an embodiment of the present invention. Reference is made to modules in FIG. 3. At step 270 a nGet (or ncGet) instruction is executed by the processor 100. At step 272 the empty signal of the input FIFO 228 is checked to determine if it has been asserted, e.g., equal to 1. If asserted, then the FIFO 228 is empty and the carry bit 252 of the MSR 250 is set to 0 (step 274). If the empty signal is not asserted, e.g., equal to 0, then the carry bit is set to 1 (step 276). At step 278 the processor 100 asserts the read signal to FIFO 228. The FIFO 228 then sends the data item to processor 100, which receives the data item (step 280). At step 282 the next instruction is executed.

The process is similar for the processor 100 putting an item of data to output FIFO 230. A nPut (or ncPut) instruction is executed, and the full signal from FIFO 230 is checked. If asserted, then the carry bit of 252 is set to 1. Is not asserted, i.e. the output FIFO 230 is not full, then the carry bit of 252 is set to 0. In addition, the processor 100 asserts the write signal and sends the data item to output FIFO 230.

In order to facilitate the faster transfer of data between the source processor and the receiver processor, a control bit is added to the data word be data word. For example, if the data word is 32 bits, then the control bit is the 33rd bit in a preferred embodiment of the present invention. In an alternative embodiment the control bit of is one of the data bits, e.g., one of the 32 bits.

Get and cGet are blocking instructions, that test if the control bit is 0 or 1, respectively, of another embodiment of the present invention. For Get if the control bit of the modified data item, e.g., 33 bit modified data word, is 1, then an error flag is set in the MSR. For cGet if the control bit of the modified data item is 0, then an error flag is set in the MSR. nGet and ncGet are the non-blocking versions of Get and cGet, and the error flag is set in a similar manner.

Put and nPut set the control bit to 0. cPut and ncPut set the control bit to 1. Put and cPut are blocking put instructions. nPut and ncPut are non-blocking put instructions.

Figure 5:
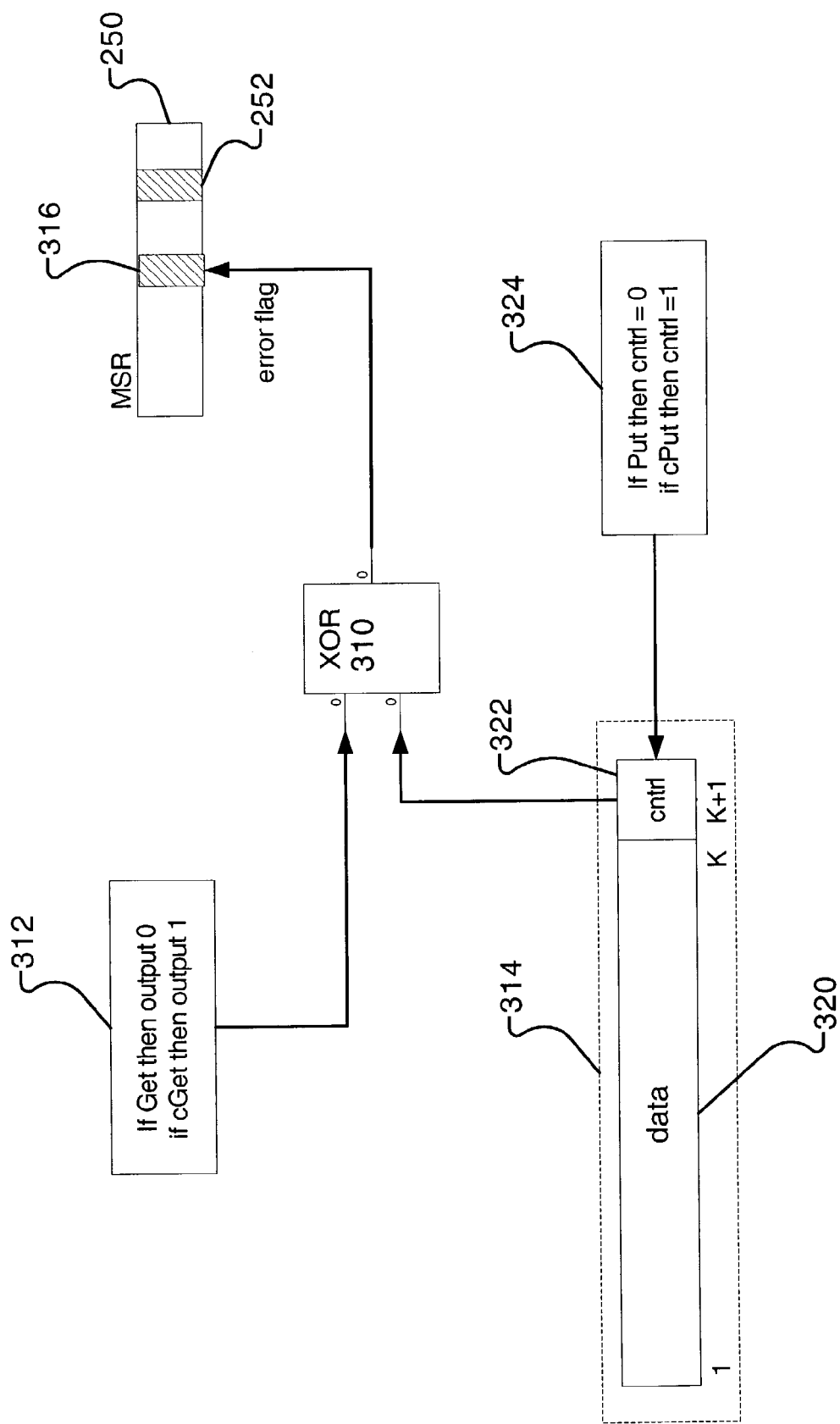
FIG. 5 shows a data item having K bits plus a control flag of an embodiment of the present invention.

FIG. 5 shows a data item 320 having K bits (1 to K) plus a control flag or bit, i.e., cntrl 332, at bit (K+1), where K is an integer. The data item 320 plus the cntrl 322 is a modified data item. For example, if K=32, then the data 320 is a 32 bit data word and the cntrl bit 322 is appended on as the 33rd bit. In an alternative embodiment the control bit 322 is one of the 1 to K bits, e.g., one of the 32 data bits. The Put (nPut) instruction 324 sets the cntrl bit 322 equal to 0, and the cPut (ncPut) instruction 324 sets the cntrl bit 322 equal to 1. In an alternative embodiment the Put (nPut) instruction sets the cntrl bit 322 equal to 1, and the cPut (ncPut) instruction sets the cntrl bit 322 equal to 0.

When a Get (nGet) instruction is executed then a 0 is output by module 312 to XOR gate 310. The other input to XOR gate is from the cntrl bit 322. When the cntrl bit is set by Put (nPut) then it is 0 and the output of XOR gate 310 clears error flag 316 MSR 250 to 0. When the cntrl bit is set by cPut (ncPut) then it is 1 and the output of XOR gate 310 sets error flag 316 MSR to 1. Similarly, when a cGet (ncGet) instruction is executed then a 1 is output by module 312 to XOR gate 310. The other input to XOR gate is from the cntrl bit 322. When the cntrl bit is set by cPut (ncPut) then it is 1 and the output of XOR gate 310 clears error flag 316 MSR 250 to 0. When the cntrl bit is set by Put (nPut) then it is 0 and the output of XOR gate 310 sets error flag 316 MSR 250 to 1. In an alternative embodiment the roles of 0 and 1 are reversed to give the same or similar results and are not further described, in order not to obscure the invention.

FIG. 6 is an example of a fast linked multiprocessor network and an example of a transfer of data between two processors of the fast linked multiprocessor network. In this example, Processor 1 410 requests via a CRC instruction (data item 430) followed by three data items (data items 432, 434, 436), that processor 2 420 calculate the cyclic redundancy code (CRC) for the three data items and return the CRC code (data item 438). Processor 1 executes a cPut FSL1, r1instruction which writes the CRC instruction word from general purpose register r1 to the output queue in FSL 1 412 and which sets the control bit to 1 in the modified word. The modified word propagates over a uni-direction serial link 414 to input queue in FSL 1 416. When processor 2 executes a cGet FSL1, r1instruction, the control bit is checked and because the error flag is 0, the CRC instruction in the modified word is loaded into general purpose register r3 of processor 2. Processor 2 then expects the data to be sent with a control flag of 1 until the last word when the control flag is 0. Continuing with the example, the next two words 432 and 434 are sent with a cPut instruction by processor 1 and retrieved by the cGet instruction at processor 2, where the error flag is 0. The last word 436 is sent with the Put FSL1, r1instruction which sets the control bit to 0. Processor 2 still uses a Getc instruction, however, the error flag in the MSR is now 1. A test of the error flag by processor 2 causes a branch to execute the CRC algorithm for the three words of data received and the CRC code result is stored in general purpose register r2. A cPut FSL2, r2 writes the CRC code to the output FIFO of FSL 2 422 and sets the control bit on a return modified word 438 to 1. The return modified word 438 propagates over a second uni-direction serial link 424 to input queue in FSL 2 426 at processor 1. When processor 1 executes a cGet FSL2, r4 instruction, the control bit is checked and because the error flag is 0, the CRC code in the return modified word is loaded into general purpose register r4 of processor 1.

SUMMARY

Several get and put instructions were described for reading and writing data items, including commands, to and from one or more queues connected to a processor, where the one or more queues are connected by a point-to-point communications channel to another computer resource, for example, another processor. The computer resource further includes a memory having for example a FIFO, a network device and an input or output device.

The Get/Put and cGet/cPut instructions are blocking commands that stop the processor if the queue is empty/full. The nGet/nPut and ncGet/ncPut instructions are non-blocking commands, that while they set a flag in the MSR, the processor continues executing when the queue is empty/full. In two combinations, the Get/Put and nGet/nPut instructions are blocking and non-blocking instructions that operate on a typical data word (i.e., without the control bit). In another combination, Get/Put and cGet/cPut instructions are blocking commands that operate on a modified data word, (i.e., with the control bit added). In yet another combination, nGet/nPut and ncGet/ncPut instructions are non-blocking commands that operate on the modified data word.

The methods of the present invention can be performed by software, firmware, or microcode operating on a computer or computers of any type. Additionally, software embodying the present invention can comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Further, such software can also be in the form of a computer data signal embodied in a carrier wave, such as that found within the well-known Web pages transferred among computers connected to the Internet. Accordingly, the present invention is not limited to any particular platform.

In addition, although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software.

Accordingly, all such modifications and additions are deemed to be within the scope of the invention, which is to be limited only by the appended claims and their equivalents.

What is claimed is:

1. A method for a processor getting data from a queue, the processor, comprising a status register having a flag indicating an arithmetic carry, configured to execute a plurality of instructions, the method comprising:

coupling the processor to an input queue storing data received by way of a point-to-point communication channel from a second processor;

receiving an empty indication at an inverter;

receiving an inverted output of the inverter and an asserted value at an AND gate, when an instruction executed by the processor is a non-blocking get instruction;

producing, by the AND gate, the value of the flag of the status register;

when the input queue is not empty of data, assuring that the flag stored in the status register located in the processor is equal to a predetermined value;

reading an item of data from the input queue received by way of the point-to-point communication channel, if the flag is equal to the predetermined value;

coupling the item of data to a general purpose register of the first processor; and executing an instruction of the plurality of instructions executed by the first processor based upon the value of the flag.

2. The method of claim 1 wherein the instruction is an arithmetic instruction, and further comprising, a second instruction of the plurality of instructions, the second instruction using a result of the arithmetic instruction to determine if a branch to a third instruction of the plurality of instructions is taken.

3. The method of claim 2 wherein the arithmetic instruction is an add with carry or a subtract with carry instruction used by a microprocessor configured on a field programmable gate array.

4. The method of claim 1 wherein the reading an item of data from the input queue comprises:

sending a read request to the input queue; and receiving the item of data from the input queue.

5. The method of claim 1 further comprising:

when the input queue is empty of data, setting the flag to another predetermined value.

6. A system for getting data via a communications link comprising:

an input queue, comprising an empty indication, coupled to a point-to-point communication channel for receiving an item of data from a first processor;

an inverter receiving an empty indication and producing an inverted output;

an AND gate receiving the inverted output and an asserted value, when an instruction executed by the processor is a non-blocking get instruction, and producing the value of a carry flag;

a second processor, coupled to the input queue and comprising a plurality of registers, for using the item of data;

a general purpose register of the plurality of registers, coupled to the input queue receiving the item of data by way of the point-to-point communication channel, for storing the item of data; and a second register of the plurality of registers, comprising a status register of the second processor having the carry flag configured for evaluation by an arithmetic instruction executed by the second processor, wherein a value of the carry flag is based on the empty indication.

7. The system of claim 6 wherein the input queue is a fast simplex link (FSL) first-in-first-out (FIFO) queue.

8. The system of claim 6 wherein the value of the carry flag is a function of the empty indication and a predetermined value for a get instruction, wherein when the get instruction is executed by the second processor, the item of data is loaded from the input queue to the general purpose register.

9. The system of claim 8 wherein the function is a Boolean and includes a NOT and an AND function.

10. A system for putting data via a communications link comprising:

a queue, comprising a full indication, coupled to the communications link for sending an item of data;

a processor, comprising a plurality of registers, for using the item;

a first register of the plurality of registers coupled to the queue, the first register configured to store the item for transfer to the queue; and second register of the plurality of registers, comprising a carry flag configured for evaluation by an arithmetic instruction executed by the processor, wherein a value of the carry flag is based on the full indication;

an inverter receiving the full indication and producing an inverted output; and an AND gate receiving the inverted output and an asserted value, when an instruction executed by the processor is a non-blocking put instruction, and producing the value of the carry flag.

11. A fast linked multiprocessor network, comprising:

a plurality of processing modules, wherein each processing module of said plurality of processing modules comprises a status register and a general purpose register; and a selector circuit coupled between the general purpose register of a processor and a plurality of queues;

a plurality of configurable uni-directional links coupled among a plurality of queues of a first processing module and a plurality of queues of a second processing module of the plurality processing modules, the plurality of configurable unidirectional links providing communications channels between the first processing module and the second processing module;

wherein a configurable uni-directional link of the plurality of configurable uni-directional links comprises an output queue of the first processing module at a first end of a communications channel and an input queue of the second processing module at a second end of the communications channel;

wherein the status register of the first processing module of the plurality of processing modules includes a flag having an indication if the input queue is not empty;

an inverter receiving a full indication from the output queue and producing an inverted output; and an AND gate receiving the inverted output and an asserted value, when an instruction executed by the processor is a non-blocking put instruction, and producing the value of the flag of the status register of the first processing module of the plurality of processing modules.

12. The fast linked multiprocessor network of claim 11 further comprising an OR gate coupled to the output of the AND gate and another indication and configured to set the flag.

13. The fast linked multiprocessor network of claim 11 wherein the input queue is a first-in-first-out (FIFO) queue and the output queue is another first-in-first-out (FIFO) queue.

14. The fast linked multiprocessor network of claim 11 further comprising:

a data item sent from the general purpose register of the first processing module of the plurality of processing modules to the general purpose register of a second processing module of the plurality of processing modules via the configurable uni-directional link of the plurality of configurable unidirectional links.

15. The fast linked multiprocessor network of claim 14 wherein the data item comprises a control bit.

16. The fast linked multiprocessor network of claim 14 wherein the data item comprises a data word and an additional bit set by the first processing module.

17. The fast linked multiprocessor network of claim 11 wherein a processing module of plurality of processing modules is configure in a field programmable gate array (FPGA).

18. A system for getting data from a processor, configured to execute a plurality of instructions, the system comprising:

a plurality of point-to-point communication channels coupled between a first processor and a second processor;

an input queue coupled to a general purpose register of the first processor and to receive data from a second processor by way of a point-to-point communication channel of the plurality of point-to-point communication channels, the first processor having a status register;

when the input queue is not empty of data, means for setting a flag of the status register to a predetermined value comprising an inverter receiving an empty indication and producing an inverted output; and an AND gate receiving the inverted output and an asserted value, when an instruction executed by the processor is a non-blocking get instruction, and producing the value of the flag of the status register;

means for reading an item of data from the input queue received from the second processor by way of the point-to-point communication channel, if the flag is equal to the predetermined value; and means for executing an instruction of the plurality of instructions executed by the processor based upon the value of the flag.

* * * * *